United States Patent Office 3,417,075
Patented Dec. 17, 1968

3,417,075
BASIC MONOAZO DYESTUFFS
Georges Henry Raymond Mingasson, Paris, Robert Frederic Michel Sureau, Enghien-les-Bains, and Victor Marie Dupré, Louvres, France, assignors to Etablissements Kuhlmann, Paris, France
No Drawing. Filed Oct. 19, 1964, Ser. No. 404,947
Claims priority, application France, Oct. 17, 1963, 950,890
6 Claims. (Cl. 260—162)

ABSTRACT OF THE DISCLOSURE

Dyestuffs of the formula:

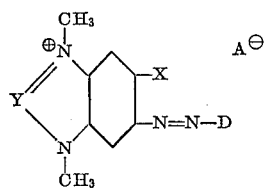

in which X represents a member selected from the group consisting of hydrogen, chlorine and the methyl group, Y represents a member selected from the group consisting of the nitrogen atom and the

group wherein R represents a member selected from the group consisting of the hydrogen atom, the methyl group and the unsubstituted phenyl group, D represents a member selected from the group consisting of 3-methyl-5-pyrazolon-4-yl, 3-methyl-1-phenyl-5-pyrazolon-4-yl, 4-dialkylamino-phenyl, 2-acetylamino-4-amino-phenyl, 2,5-dimethoxy-4-amino-phenyl, 2-methoxy-5-methyl-4-aminophenyl, 2,5-dimethoxy-4-dialkylamino-phenyl, 2-amino-1-naphthyl, 2-hydroxy-1-naphthyl, 2-alkylamino-1-naphthyl, 1-amino-4-naphthyl, 2-phenylamino-1-naphthyl, said alkyl groups having 1 and 2 carbon atoms, and A represents a monovalent anion.

---

The present invention concerns improvements in and relating to new basic azo dyestuffs.

According to the invention new basic azo dyestuffs are provided of the following general formula:

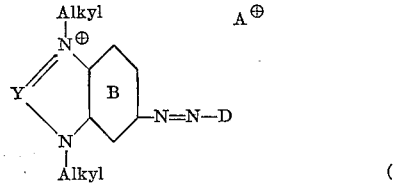

in which the nucleus B may be substituted by a halogen atom or a methyl or methoxy group, D represents the residue of an amino, hydroxyl or keto-enol coupling compound not containing sulphonic or carboxyl groups, Y represents a nitrogen atom or a

group, R being a hydrogen atom, an alkyl radical or a phenyl group, and A represents a monovalent anion or its equivalent.

The invention also includes a process for the preparation of the dyestuffs of Formula I which comprises converting compounds of Formula II, in which E represents a nitro or acylamino group, into quaternary compounds III, converting the group E into an amino group, diazotising the amine IV thus obtained and coupling the diazo derivative formed with a coupling compound of the formula DH.

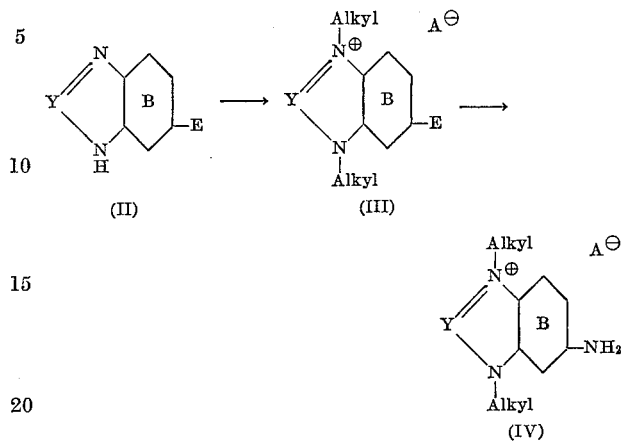

In the Formulae II, III and IV, the possible substituents of B and the significance of A and Y are the same as above.

The formation of the quaternary compounds of II may be effected by the action of an alkylating agent of the formula A-Alkyl, for example an alkyl halide, sulphate or sulphonate, possibly in the presence of a solvent such as benzene, toluene, a xylene or chlorinated derivative thereof, an alcohol or dimethylformamide.

The formation of the quaternary compounds of II may also be effected in two stages. In the first phase the compound II is alkylated in aqueous alkaline solution, by the A-alkyl agent. The monoalkyl derivative obtained is then converted into the quaternary compound as in the direct operation described above.

The quaternary compounds III are crystalline salts which are very soluble in water, and in consequence are easily converted into amino derivatives IV. If E is a nitro group, the conventional methods of reduction in an aqueous medium are applicable. If E is an acylamino group, the acyl group can be hydrolysed by heating in aqueous alkaline or acid medium.

The salts IV are in the same way very soluble in water, and their diazotisation, as well as the coupling of the diazo derivatives obtained with the coupling compounds D—H, may be effected without particular difficulty, according to known methods.

The dyestuffs of Formula I, generally very soluble in water, may be isolated from their solutions by salting out with sodium chloride possibly after the addition of zinc chloride. They are suitable for the general applications of basic dyestuffs and in particular are suitable for the colouration of fibres based on polymers or copolymers of acrylonitrile, which they dye in shades covering a very wide range.

The invention will be more clearly understood by reference to the following examples which are purely illustrative and in which the parts are parts by weight unless the contrary is indicated.

EXAMPLE 1

41.4 parts of dimethyl sulphate are gradually introduced, while stirring, at a temperature between 20° C. and 25° C., into a solution of 48.9 parts of 5(6)-nitro-benzimidazole in 250 parts by volume of a 6% caustic soda solution. 5(6)-nitro-1-methyl-benzimidazole is rapidly precipitated. It is filtered, washed until the washings are neutral and dried, 45 parts by weight being obtained.

8.9 parts of the above product are gradually introduced, while stirring, into 14 parts of dimethyl sulphate, heated to 120–130° C. The mixture is heated again for an hour at 130° C., allowed to cool and 100 parts of water are added. The quaternary salt is completely soluble. After neutralisation by means of sodium carbonate, the solution is reduced as it is.

The solution of the 5(6)-nitro-1,3-dimethyl-benzimidazolium sulphomethylate is reduced by slowly introducing it into a boiling mixture comprising 12.5 parts of iron filings, 100 parts of water and 1 part of acetic acid. After reduction, the mixture is made alkaline by sodium carbonate, filtered hot and the iron sludge is washed with a little hot water. The solution is used as it is for the preparation of the dyestuffs.

200 parts by volume of a solution of 5(6)-amino-1,3-dimethyl-benzimidazolium sulphomethylate containing 0.25 mol of base per litre, are acidified by the addition of 15 parts by volume of 10 N hydrochloric acid. The solution, cooled is between 0° C. and +5° C., is diazotised with 25 parts by volume of a 2 N solution of sodium nitrite. The solution of the diazo derivative is slowly introduced into a solution of 2.8 parts of 3-methyl-5-pyrazolone in 100 parts of water containing 10 parts of sodium acetate. The yellow dyestuff formed precipitates in a crystalline form. After one nihgt it is filtered off and drained. The dyestuff dyes acrylic fibres a greenish yellow shade endowed with excellent fastness.

EXAMPLE 2

On replacing the 3-mbethyl-5-pyrazolone in the preceding example with 4.8 parts of 1-phenyl-3-methyl-5-pyrazolone in solution in 100 parts of water containing 3.6 parts of 40% caustic soda solution and 3 parts of sodium carbonate, a yellow dyestuff is obtained which dyes acrylic fibres a little more reddish shade.

The following table lists other examples of dystuffs prepared in a similar way with the same diazo compound but different coupling compounds.

| Example | Coupling compounds | Shades on acrylic fibres |
| --- | --- | --- |
| 3 | N,N-diethylaniline | Orange yellow. |
| 4 | 2-methoxy-5-methyl aniline | Do. |
| 5 | N-monoacetyl m-phenylenediamine | Brown yellow. |
| 6 | N,N-dimethylaniline | Orange. |
| 7 | β-Naphthylamine | Do. |
| 8 | 2,5-dimethoxy-aniline | Do. |
| 9 | β-Naphthol | Red-orange. |
| 10 | N-ethyl β-naphthylamine | Orange red. |
| 11 | α-Naphthylamine | Red. |
| 12 | N-phenyl β-naphthylamine | Red. |

EXAMPLE 13

53.1 parts of 5(6)-nitro-2-methyl-benzimidazole are dissolved in 300 parts by volume of a 6% solution of caustic soda. Then 41.4 parts of methyl sulphate are added with efficient stirring at 20–25° C. in a period of one hour. The mixture is stirred for another hour, then the precipitate of 5(6)-nitro-1,2-dimethyl-benzimidazole is filtered off, washed until the washings are neutral and dried. 55 parts of this compound are obtained.

57.3 parts of 5(6)-nitro-1,2-dimethyl-benzimidazole are dissolved at boiling point, under reflux, in 600 parts by volume of chloroform. 42 parts of methyl sulphate are added to the agitated solution in an hour, still under reflux. The mixture is heated for 3 hours, then cooled, and the solid product is filtered off and dried. 86 parts of 5(6)-nitro-1,2,3-trimethyl-benzimidazolium sulphomethylate are obtained.

A mixture comprising 50 parts of iron filings, 100 parts of water and 2 parts of acetic acid is heated up to refluxing and a solution of 47.5 parts of the preceding quarternary salt in 100 parts of water is gradually added. The mixture is heated for half an hour, made alkaline by the addition of sodium carbonate, and the sludge of iron oxide is filtered off in the hot and washed with hot water. 400 parts by volume of a solution of 5(6)-amino-1,2,3-trimethyl-benzimidazolium sulphomethylate are obtained, which is used as it is for the preparation of dyestuffs.

The preceding solution is acidified by the addition of 30 parts by volume of 10 N hydrochloric acid, then diazotised at between 0° C. and 5° C. with a 2 N solution of sodium nitrite. The solution of the diazo derivative is gradually introduced into a solution of 14.7 parts of 3-methyl-5-pyrazolone in 100 parts of water containing 21.5 parts of 40% caustic soda solution and 30 parts of sodium acetate. The mixture is left overnight with stirring, and the dyestuff which has precipitated in crystalline form is filtered off, 50 parts being obtained. This dyestuff dyes acrylic fibres a greenish-yellow shade endowed with excellent general fastness.

The following table lists a number of analogous examples carried out in a similar manner. The second column simply gives the cation of the diazo compound.

| Ex. | Diazo compound | Coupling compound | Shades on acrylic fibres |
| --- | --- | --- | --- |
| 14 | 5(6)-amino-1,2,3-trimethyl-benzimidazolium. | 1-phenyl-3-methyl-5-pyrazolone. | Golden yellow. |
| 15 | do | 2-methoxy-5-methyl aniline. | Do. |
| 16 | do | N-monoacetyl-m-phenylenediamine. | Orange yellow. |
| 17 | do | 2,5-dimethoxy-aniline | Do. |
| 18 | do | N,N-dimethylaniline | Orange. |
| 19 | do | N,N-diethylaniline | Do. |
| 20 | do | β-Naphthylamine | Do. |
| 21 | do | β-Naphthol | Orange red. |
| 22 | do | α-Naphthylamine | Do. |
| 23 | do | N-ethyl-β-naphthylamine. | Red. |
| 24 | 5(6)-amino-6(5)-chloro-1,2,3-trimethyl-benzimidazolium. | 3-methyl-5-pyrazolone | Greenish yellow. |
| 25 | do | 1-phenyl-3-methyl-5-pyrazolone. | Orange yellow. |
| 26 | 2(6)-amino-1,2,3,6(5)-tetramethyl-benzimidazolium. | 3-methyl-5-pyrazolone | Greenish yellow. |
| 27 | do | 1-phenyl-3-methyl-5-pyrazolone. | Orange yellow. |

EXAMPLE 28

28.8 parts of 5(6)-nitro-2-phenyl-benzimidazole sulphate are dissolved in 150 parts of water containing 35 parts of 40% caustic soda solution. In a period of about one and a half hours, 16 parts of methyl sulphate are introduced into this warm solution maintained at 30° C. It is then stirred for a further hour while cooling to ordinary temperature, and the solid product is filtered off, washed until the washings are neutral and dried. 23 parts of 5(6)-nitro-1-methyl-2-phenyl-benzimidazole are obtained.

20.2 parts of the above product are gradually added, while stirring, to 20 parts of methyl sulphate heated to 120° C. After the introduction, the mixture is heated at 140° C., for 2 hours and then poured into 200 parts of water. The mixture is then stirred for 2 hours.

The solution of the quaternary nitro derivative, neutralised by addition of sodium carbonate, is gradually introduced while stirring into a boiling mixture of 20 parts of iron filings, 50 parts of water and 2 parts of acetic acid. After reduction, the product is made alkaline with sodium carbonate, filtered in the hot, and the iron oxide sludge is washed with a little hot water. The solution of the 5(6)-amino-1,3-dimethyl-2-phenyl-benzimidazolium salt is used as it is, after acidification with hydrochloric acid, for the diazotisation. The dyestuff obtained by coupling with the 3-methyl-5-pyrazolone dyes acrylic fibres a greenish yellow shade.

EXAMPLE 29

By proceeding as in Example 28, except that 1-phenyl-3-methyl-5-pyrazolone is used in place of 3-methyl-5-pyrazolone one obtains a dyestuff which dyes acrylic fibres an orange-yellow shade.

EXAMPLE 30

19.8 parts of 5(6)-amino-1,3-dimethyl-benzotriazolium chloride, the preparation of which has been described in Example 1 of French Patent 1,364,560, are dissolved in 500 parts of water containing 60 parts of 10 N hydrochloric acid. A solution of 7 parts of sodium nitrite in 25 parts of water are introduced in a period of one and a half hours at a temperature from 0° C. to 5° C. The mixture is stirred for 20 minutes and the solution of the diazo derivative is introduced into a solution of 10.8 parts of 1-methyl-5-pyrazolone in 200 parts of water containing 30 parts by volume of 10 N caustic soda. During the introduction the alkalinity is maintained by the addition of sodium carbonate.

When the diazo compound has disappeared, 100 parts of sodium chloride are added, and the mixture is stirred for 3 hours. The yellow dyestuff precipitated is filtered off, drained and dried. Dry weight: 14 parts. This dyestuff dyes acrylic fibres a greenish yellow shade of good fastness.

The following table lists a number of analogous examples, carried out in a similar manner, with the same diazo compound but different coupling compounds.

| Example | Coupling compound | Shades on acrylic fibres |
| --- | --- | --- |
| 31 | 1-phenyl-3-methyl-5-pyrazolone | Yellow. |
| 32 | N-diethylaniline | Red. |
| 33 | N-dimethyl-2,5-dimethoxy-aniline | Brick red. |
| 34 | N-monoacetyl-m-phenylenediamine | Orange. |
| 35 | β-Naphthylamine | Scarlet. |

We claim:
1. Dyestuffs of the formula:

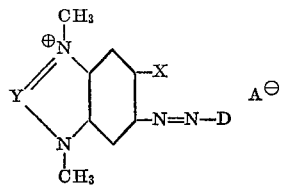

in which X represents a member selected from the group consisting of hydrogen, chlorine and the methyl group, Y represents a number selected from the group consisting of the nitrogen atom and the

group wherein R represents a member selected from the group consisting of the hydrogen atom, the methyl group and the unsubstituted phenyl group, D represents a member selected from the group consisting of 3-methyl-5-pyrazolon - 4 - yl, 3-methyl-1-phenyl-5-pyrazolon-4-yl, 4-dialkylamino-phenyl, 2-acetylamino-4-amino-phenyl, 2,5-dimethoxy-4-amino-phenyl, 2-methoxy-5-methyl-4-amino-phenyl, 2,5-dimethoxy-4-dialkylamino-phenyl, 2-amino-1-naphthyl, 2-hydroxy-1-naphthyl, 2-alkylamino-1-naphthyl, 1-amino-4-naphthyl, 2-phenylamino-1-naphthyl, said alkyl groups having 1 and 2 carbon atoms and A represents a monovalent anion.

2. [3 - methyl - 5- pyrazolone] - <4 azo 5 (6)> - [1,3-dimethyl benzimidazolium] methyl sulphate.

3. [3 - methyl - 5 - pyrazolone] - <4 azo 5 (6)> - [1,2,3-trimethyl-benzimidazolium] methyl sulphate.

4. [1 - phenyl - 3 - methyl - 5 - pyrazolone] - <4 azo 5 (6)>-[1,2,3-trimethyl - benzimidazolium] methyl sulphate.

5. [3 - methyl - 5 - pyrazolone] - <4 azo 5 (6)> - [1,3-dimethyl-2-phenyl-benzimidazolium] methyl sulphate.

6. [1 - phenyl - 3 - methyl - 5 - pyrazolone] - <4 azo 5 (6)> - [1,3 - dimethyl - 2- phenyl - benzimidazolium] methyl sulphate.

References Cited

UNITED STATES PATENTS

| 2,671,775 | 3/1954 | Hanhart | 260—157 |
| 3,176,020 | 3/1965 | Sureau et al. | 260—157 X |
| 3,257,378 | 6/1966 | Sureau et al. | 260—157 |

CHARLES B. PARKER, *Primary Examiner.*

D. M. PAPUGA, *Assistant Examiner.*

U.S. Cl. X.R.

260—37 157, 308, 309.2; 8—41, 55